United States Patent [19]
Burkland

[11] 3,980,276
[45] Sept. 14, 1976

[54] COLLAPSIBLE BOOM FOR VEHICLES

[76] Inventor: James R. Burkland, 5602 E. 152nd St., Puyallup, Wash. 98371

[22] Filed: Jan. 30, 1975

[21] Appl. No.: 545,704

[52] U.S. Cl. .............................. 254/139.1; 214/86 A
[51] Int. Cl.² ......................................... B66C 23/60
[58] Field of Search ....................... 254/139, 139.1; 214/86 R, 86 A, 85.5, 87; 212/8, 46 R, 59 R, 46 A; 224/42.03 R; 248/169, 168, 163, 434, 435; 182/155

[56] References Cited
UNITED STATES PATENTS

| | | | |
|---|---|---|---|
| 2,470,857 | 5/1949 | Lathers, Jr. | 214/86 A |
| 2,616,666 | 11/1952 | Honey | 254/139.1 |
| 2,907,473 | 10/1959 | Garnett | 254/139.1 |
| 3,794,296 | 2/1974 | Hasstedt | 254/139.1 |
| 3,827,586 | 8/1974 | Lambert, Sr. | 254/139.1 |

Primary Examiner—L. J. Paperner
Assistant Examiner—Kenneth Noland
Attorney, Agent, or Firm—Morris A. Case

[57] ABSTRACT

A lightweight collapsible boom assembly is disclosed. It is particularly suitable for use with a multipurpose vehicle of the type used in emergency rescue operations because it can be stored in a limited space within the vehicle and quickly removed and installed for lifting heavy objects with a winch and cable. Connecting means pivotally attach a pair of upper members to an upright member in an aligned parallel relationship for storage, and guide movement of the members into a spread apart relationship for reacting cable loads when the upper members are installed on the vehicle. The disclosed preferred embodiment utilizes an adjustable length upright member attached to a lower strut secured to the vehicle. A support device, optionally either a shoe or wheel, reacts vertical loads from the upright member and the lower strut.

16 Claims, 8 Drawing Figures

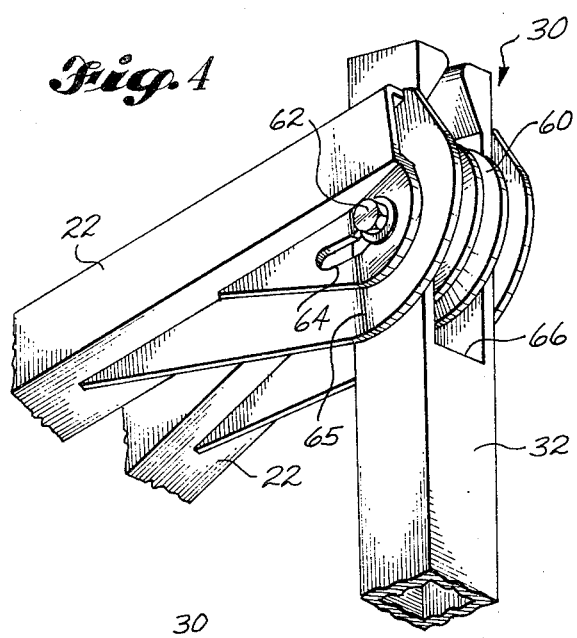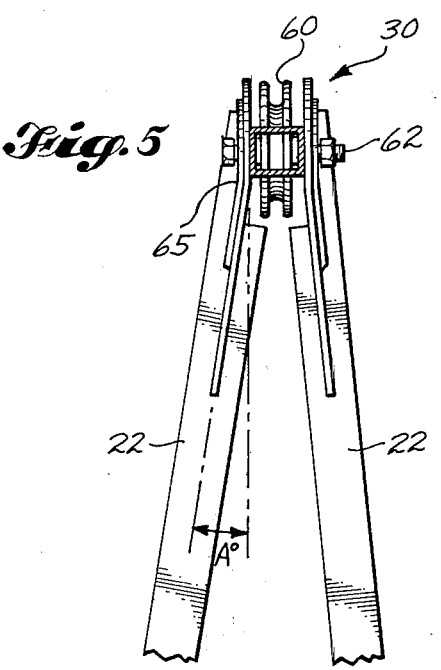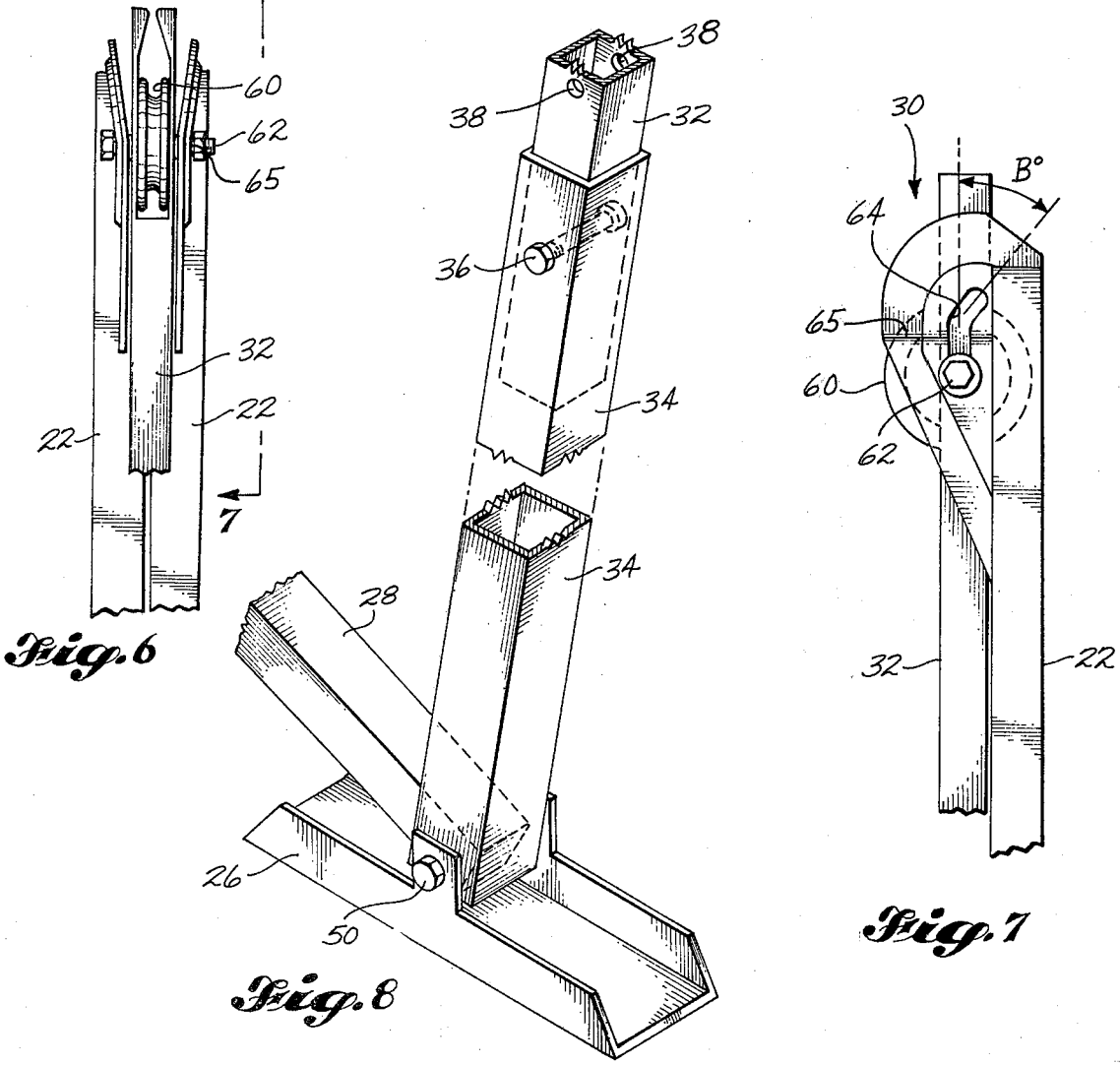

COLLAPSIBLE BOOM FOR VEHICLES

BACKGROUND OF THE INVENTION

1. Field of the Invention

This invention relates to a collapsible boom for use with a motor vehicle; and more particularly, to a boom which is portable, in that it may be readily and conveniently collapsed for storage in a limited space within a vehicle and thereafter quickly and easily attached to the vehicle for use with a powered winch and cable to lift heavy objects; as for example, in emergency operations by a rescue unit truck.

2. Discussion of Prior Art

Various devices have been proposed in the past for attachment to vehicles for the purpose of hoisting large objects. See for example, the tractor attachments shown in the U.S. Patents to Lathers U.S. Pat. No. (2,470,857), to Hart U.S. Pat. No. (2,797,829), and Bergerson et al (U.S. Pat. Nos. 3,077,338 and 3,141,654). Prior art tow truck attachments are exemplified by the U.S. Patents to Heinss U.S. Pat. No. (2,450,798) and Guerard (U.S. Pat. No. 2,864,584). Special purpose truck mounted hoisting devices are shown in the U.S. Patents to Smith (U.S. Pat. No. 1,372,838 —to placement of telephone poles) and to Ferguson (U.S. Pat. No. 2,436,510 —to tree puller).

The prior art devices cited above, while structurally sound and useable, suffer from the deficiency that they are relatively heavy in construction, and are cumbersome or impossible to disassemble and store in a compartment within the vehicle. Therefore, they are of no real value for use with a multipurpose vehicle such as, for example, a medical aid truck, or a truck adapted for emergency rescue work.

Accordingly, some of the primary objects of this invention are to provide a new and improved collapsible boom assembly which is: (1) portable, in that it may be quickly attached to a vehicle for use with a winch and cable system, then compactly collapsed for storage in a relatively small space within the vehicle; (2) structurally efficient and capable of handling large loads; (3) lightweight for convenience in handling; and (4) suitable for use with a multipurpose vehicle such as a medical aid truck or a truck adapted for emergency rescue work.

SUMMARY OF THE INVENTION

The above and other objects of the invention are achieved in the disclosed preferred embodiment wherein connecting means are used to pivotally connect a pair of upper members to an upright member in an aligned parallel relationship for storage. The connecting means serve to guide movement of the members into an operative spread apart relationship when the members are attached to the vehicle for hoisting operations. The upper members attach to the top of the front bumper on either side of a powered winch and cable assembly. The length of the upright member is adjustable. A lower strut connects and anchors the lower end of the upright member to the bottom of the front bumper. A support device, shown optionally as either a shoe or a wheel, serves to react vertical loads from the upright member and the lower strut. The disclosed connecting means include flanges attached to the end of each upper member and slotted and bent in a certain manner. A sheave is journaled, about a bolt passing through the upright member, for rotation and guidance of the cable. The bolt extends through the slots in the flanges of the upper members. These flanges, bolt, and slots of the connecting means serve to guide the members into position either for storage or for operations.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 4 is a fragmented isometric view of the connecting means of the invention.

FIG. 5 is a bottom view of the connecting means with the upright and upper members positioned for reacting loads.

FIG. 6 is an end view similar to FIG. 5 except the members have been collapsed for storage.

FIG. 7 is a side view taken at 7—7 in FIG. 6.

FIG. 8 is a fragmented isometric view of a support device connected to the upright member and the lower strut.

DESCRIPTION OF THE PREFERRED EMBODIMENT

Figure 1:
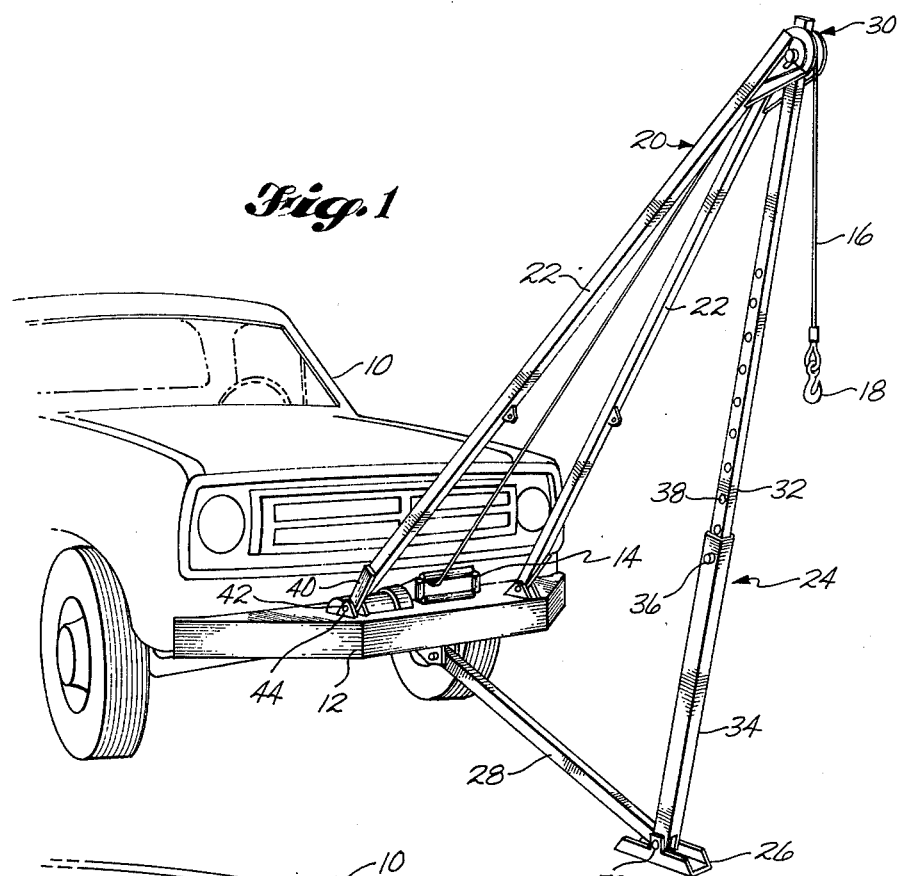
FIG. 1 is a pictorial diagram illustrating a preferred embodiment of the collapsible boom assembly of this invention attached to fittings on the front bumper of a truck.

FIG. 1 is a pictorial diagram illustrating a truck 10 equipped with a heavy duty bumper 12, and a powered winch assembly 14 having a cable 16 to which is attached a hook 18. A collapsible boom 20 constructed in accordance with the principles of this invention is shown to be attached to bumper 12 in an operative position for raising or lowering an object attached to hook 18.

As illustrated in FIG. 1 the collapsible boom assembly 20 generally comprises a pair of upper members 22, an upright member 24, a support device 26, and a lower strut 28. As is more apparent in other figures of the drawings, a connecting means 30 pivotally interconnects the upper members 22 with the upright member 24, and supports a sheave over which the cable 16 is passed. The upright member 24 comprises an upper portion 32, and a lower portion 34. Upright member 24 is adjustable in length, being provided with a pin 36 which passes through an aperture in lower portion 34 and through a selected one of the apertures 38 in upper portion 32.

Figure 2:
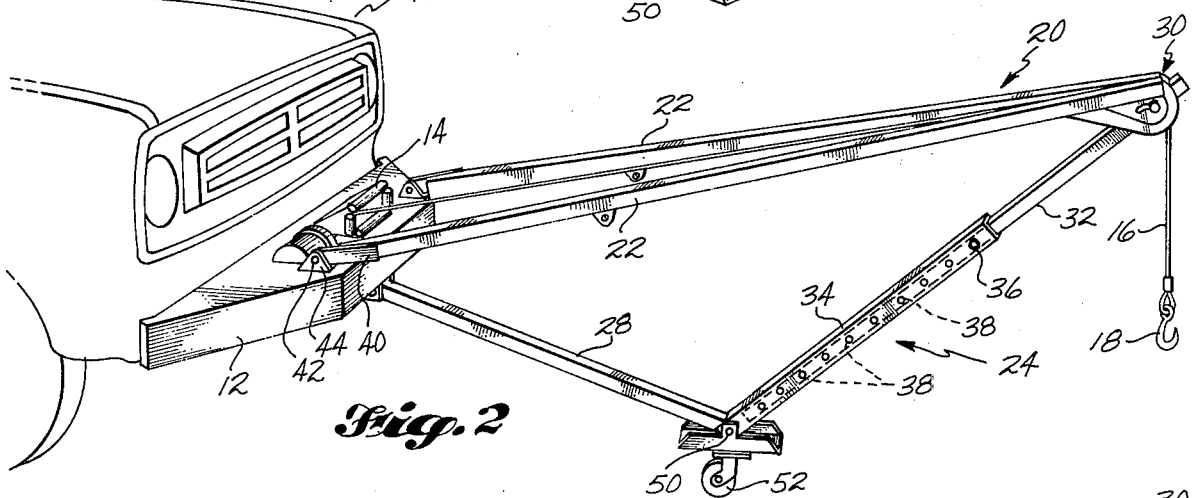
FIG. 2 is a diagram similar to FIG. 1 except the collapsible boom is extended at a different angle from the truck and an optional wheel has been added under the central support device for increased mobility.

Each of the upper members 22 is provided with a means for attachment to the bumper 12. As shown in FIG. 1, these means comprise a bearing plate 40 having a hole through which a bolt 42 is passed for attachment of the member 22 to a fitting 44 on bumper 12. The bearing plate 40 is preferably welded or otherwise attached to the upper member 22 at a angle which departs from the longitudinal axis of member 22 an amount such that the plate 40 is approximately perpendicular to the bolt 42 when the boom is in its operative positions, the opposite extremes of which are illustrated by FIGS. 1 and 2, respectively.

The lower strut 28 is similarly provided with means for attachment to the bottom of the bumper 12, and is attached to upright member 24 and support device 26 by a bolt or permanent pin 50. In the FIG. 1 embodiment the support device 26 comprises a channel member which bears against the ground, in the manner of devices sometimes known as shoes. In the FIG. 2 embodiment a wheel 52 is eccentrically mounted or castered for free pivoting about a vertical axis, so that the wheel tends to track the direction of motion when, and if, the truck is moved to reposition the boom assembly.

Figure 3:
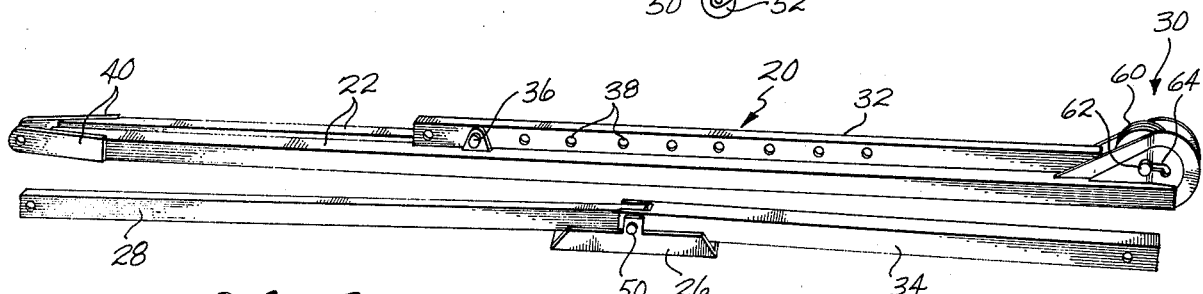
FIG. 3 is a pictorial diagram of the boom assembly removed from the truck and collapsed for storage.

FIG. 3 shows the boom assembly 20 collapsed and ready for storage in a small compartment within the truck 10. As will be more apparent upon examination of the detailed figures which follow, the connecting means 30 have guided the upper members 22 and the upper portion 32 of upright member 24 from their spread apart operative positions into a parallel alignment for storage. The connecting means 30 comprise a sheave 60 journaled about a bolt 62 which extends through a slot 64 in the flange of the upper members 22. The pin 36 has been withdrawn from lower portion 34 of upright member 24 and has now been inserted through the small upstanding flanges of upper members 22. The lower portion 34 and lower strut 28 have each been rotated about pin 50 into generally coaxial alignment for storage. Accordingly, it is evident that the entire boom assembly may now be stored in a relatively small rectangularly walled storage space, such as could readily be constructed along the length of the bed of a truck.

FIG. 4 is a fragmented isometric view of the connecting means 30 of the invention, showing the bolt 62 extending through the upper portion of slot 64. As will be more apparent in the figures which follow, the lower portion of slot 64 is substantially parallel to the longitudinal axis of upper members 22 while the upper portion of the slot acts as a detent means in that it extends perpendicularly toward, or is sloped with respect to, the longitudinal axis of members 22. The flanges of upper members 22 can be seen to be redirected outwardly away from the upper portion 32 of upright member 24 along bend lines 65 which are generally perpendicular to the lower portion of the slot 64. The sheave 60 is journaled for rotation about bolt 62 in the recess 66 of upper portion 32.

FIG. 5 is a bottom view of the connecting means 30 in the operative position of FIG. 4. The angle labeled A shows the extent to which the flanges have been bent, or redirected about the bend lines 65. As shown here, the angle A is of the order of 8°. It will be recognized that the angle A is predetermined to allow the outer surface of the flanges to nestingly engage the upper portion 32 of the upright member. As shown here, the angle A is of the order of 8° – 10° for a boom having geometry as illustrated. It will be understood that, depending on the desired geometry of the boom assembly, the angle A could range from a few degrees to perhaps 45° for a short and wide-based design.

FIG. 6 is a bottom view similar to FIG. 5 except that the members have been collapsed for storage; the two upper members 22 brought together and upper portion 32 of upright member 24 rotated into a parallel alignment.

FIG. 7 is a side view taken at 7—7 in FIG. 6. The slot 64 can be seen to comprise a lower portion aligned parallel to the longitudinal axis of member 22, and an upper portion which is directed inwardly back toward the member 22 and acts as a detent means for the joint. The angle B is shown here at about 45° but a wide range is permissible, including B = 90°, corresponding to a more conventional detent recess. Note that the bend lines 65 are located at the middle of slot 64. Therefore when the bolt 62 is positioned in the lower portion of slot 64 the three members 22, 32, 22 will be aligned parallel for storage as shown in FIGS. 6 and 7. When the members are moved to the operative position the bolt 62 must be positioned in the upper portion of the slot, as shown in FIGS. 4 and 5. In the operative position, upper flat portions of the flanges are nested against and hence are parallel to the walls of upper portion 32.

It should be apparent then that the connecting means 30 comprise the bent flanges of upper members 22, the slot 64, and the bolt 62 to provide a means for guiding and aligning each of the members into an appropriate position at the upper, or first, junction of the boom assembly in either the operative or storage positions.

FIG. 8 is a fragmented isometric view of the support device 26, the lower portion 34 of the upright member 24, and the lower strut 28. Pin 50 may be permanently connected since it is not necessary to remove it for storage. Note that the cross-sectional shapes for the structural members (28, 32, 34) are shown as rectangular tubes. This type of section is lightweight and structurally efficient and lends itself to construction of a boom assembly of the type described, although it is of course apparent that the inventive concepts which have been disclosed here are applicable to all other types of structural sections with certain obvious modifications.

While a preferred embodiment of the invention has been shown and described, it likewise will be apparent to persons skilled in the mechanical arts that many other changes may be made. Most of the major features which have been shown here have well-known equivalent optional mechanical devices which can be used to perform similar functions without departing from the spirit and scope of this invention. Accordingly, the invention described here should be considered to be limited only by the scope of the appended claims.

What is claimed and desired to be secured by U.S. Letters Patent is:

1. A collapsible boom assembly suitable for storage in a limited space within a vehicle and adapted for quick and easy attachment to the vehicle for raising and lowering heavy objects with a cable and winch assembly, said collapsible boom assembly comprising:
   a pair of upper members, each having at one end thereof means for attachment to said vehicle;
   an upright member;
   a sheave device adapted to guide said cable;
   connecting means pivotally interconnecting at a first juncture each of said pair of upper members, said upright member, and said sheave device;
   said connecting means providing means for aligning each of said members in a substantially parallel relationship for storage in a minimum space, and means for controlling and guiding relative movement of said upright member with respect to said upper members in a direction parallel to the longitudinal axis of said upper members and into a spread apart relationship for reacting loads imposed on said sheave device when said upper members are attached to said vehicle.

2. The collapsible boom assembly of claim 1 wherein said connecting means includes a flange member forming a slot and attached to each of said upper members.

3. The collapsible boom assembly of claim 2 wherein said upright member and said sheave device are located between said upper members and said flange member is bent outwardly, near the middle of said slot in a direction away from said upright member.

4. The collapsible boom assemby of claim 3 wherein said slot is formed such that it extends in two different directions from its middle portion; said slot extending in a first direction generally parallel to said upper members and toward said means for attachment to said vehicle; and said slot extending in a second direction generally perpendicular to said upper members, toward the opposite end of said upper members from the end having means for attachment to said vehicle.

5. The collapsible boom assembly of claim 3 wherein said flange member extends downwardly away from said upper member, and said slot extends in a direction parallel to the longitudinal axis of said upper member from one end to the middle of said slot then extends perpendicular to said longitudinal axis from the middle of the slot to the other end of said slot.

6. The collapsible boom assembly of claim 4 wherein said upright member comprises two telescoping parts which are selectively extensible to form a desired length for said upright member.

7. The collapsible boom assembly of claim 6 which includes pin and aperture means for establishing the length of said upright member, and said upper members are each provided with apertured lug means for attachment to said pin for compact storage of one of said telescoping parts with said upper members.

8. The collapsible boom assembly of claim 1 which additionally comprises a lower strut having at one end thereof means for attachment to said vehicle, and at the other end thereof means for attachment to said upright member.

9. The collapsible boom assembly of claim 8 which additionally comprises a support device for reacting vertical loads from said upright member and said lower strut into the terrain surrounding said vehicle.

10. The collapsible boom assembly of claim 9 wherein said support device comprises a channel shaped shoe type bearing device hingedly connected to each of said upright and said lower member.

11. The collapsible boom assembly of claim 9 wherein said support device comprises a wheel.

12. The collapsible boom assembly of claim 11 wherein said wheel is castered for swivel movement about a vertical axis.

13. A collapsible boom assembly suitable for storage in a limited space within a vehicle and adapted for quick and easy attachment to the vehicle for raising and lowering heavy objects with a cable and winch assembly; said collapsible boom assembly comprising:
   a pair of upper members, each having at a first end thereof means for attachment to said vehicle and at the other end thereof a flange containing a slot having a lower portion which extends parallel to said upper member from the slot's middle portion to its end located nearest said first end, and having an upper portion which extends perpendicularly toward said upper member from the slot's middle portion to its opposite end;
   a telescoping upright member having a selectively adjustable length;
   bolt means carried by said upright member for connecting said upper members through their slots on either side of said upright member;
   each of said flanges of said upper members being bent and redirected outwardly away from said upright member along bend lines substantially perpendicular to said lower portion of said slot and passing through said slot near its middle portion;
   a sheave device rotatably journaled on said bolt means;
   a lower strut hingedly attached to the lower end of said upright member and having means for attachment to said vehicle; and
   a support device attached to each of said upright member and said lower strut for reacting vertical loads into the terrain beneath said boom assembly.

14. The collapsible boom assembly of claim 13 wherein said support device includes a wheel.

15. The collapsible boom assembly of claim 14 wherein said wheel is castered to swivel about a vertical axis.

16. The collapsible boom assembly of claim 13 wherein said support device includes a shoe for bearing engagement with said terrain.

* * * * *